(12) United States Patent
Dicke et al.

(10) Patent No.: US 9,613,010 B2
(45) Date of Patent: *Apr. 4, 2017

(54) SYSTEM AND METHOD FOR LINKING AN ADDRESS

(71) Applicant: BLACKBERRY LIMITED, Waterloo (CA)

(72) Inventors: Ronald Anthony Dicke, Ottawa (CA); Michael Majid, Kanata (CA); Ngoc Bich Ngo, Kanata (CA); Hartmuth Gutsche, Kanata (CA); Xiaming Xi, Kanata (CA)

(73) Assignee: BlackBerry Limited, Waterloo (CA)

( * ) Notice: Subject to any disclaimer, the term of this patent is extended or adjusted under 35 U.S.C. 154(b) by 334 days.

This patent is subject to a terminal disclaimer.

(21) Appl. No.: 14/324,643

(22) Filed: Jul. 7, 2014

(65) Prior Publication Data

US 2014/0325325 A1 Oct. 30, 2014

Related U.S. Application Data

(63) Continuation of application No. 12/432,290, filed on Apr. 29, 2009, now Pat. No. 8,775,467.

(51) Int. Cl.
G06F 17/30 (2006.01)
G06F 17/22 (2006.01)
G06F 17/27 (2006.01)

(52) U.S. Cl.
CPC ...... *G06F 17/2235* (2013.01); *G06F 17/2765* (2013.01); *G06F 17/30985* (2013.01)

(58) Field of Classification Search
CPC ........... G06F 17/30985; G06F 17/2765; G06F 17/2235

See application file for complete search history.

(56) References Cited

U.S. PATENT DOCUMENTS

| | | |
|---|---|---|
| 6,339,795 B1 | 1/2002 | Narurkar et al. |
| 6,594,665 B1 | 7/2003 | Sowa et al. |
| 6,658,356 B2 | 12/2003 | Chen et al. |
| 6,879,983 B2 | 4/2005 | Bellamy et al. |
| 7,085,629 B1 | 8/2006 | Gotou et al. |
| 7,370,079 B2 | 5/2008 | Murata et al. |

(Continued)

FOREIGN PATENT DOCUMENTS

WO 2008/147919 A1 12/2008

OTHER PUBLICATIONS

Google Maps; http://maps.google.com/; p. 1; printed on Apr. 28, 2009.

(Continued)

*Primary Examiner* — Shiow-Jy Fan
(74) *Attorney, Agent, or Firm* — Borden Ladner Gervais LLP; Todd Keeler

(57) ABSTRACT

A method and a mobile device comprising an address linking module assess a segment of text as comprising an address and create a link. The method comprises: searching a text for a segment of text having at least two character strings satisfying a proximity constraint, each character string being of a different predefined address indicator type; assessing whether or not the segment comprises an address; displaying at least a portion of the text comprising the segment on a display of a mobile device; and if the segment is assessed as comprising an address, including a link for display, the link pointing to at least one application.

20 Claims, 5 Drawing Sheets

(56) References Cited

U.S. PATENT DOCUMENTS

| | | | |
|---|---|---|---|
| 7,444,322 | B2 | 10/2008 | Masuda et al. |
| 7,454,462 | B2 | 11/2008 | Belfiore et al. |
| 2002/0124015 | A1 | 9/2002 | Cardno et al. |
| 2004/0128353 | A1 | 7/2004 | Goodman et al. |
| 2005/0266856 | A1 | 12/2005 | Yamada et al. |
| 2006/0058953 | A1 | 3/2006 | Cooper et al. |
| 2006/0167913 | A1 | 7/2006 | Tam et al. |
| 2008/0133599 | A1 | 6/2008 | Stewart et al. |
| 2008/0134088 | A1 | 6/2008 | Tse et al. |
| 2008/0162513 | A1 | 7/2008 | Biard et al. |
| 2008/0189377 | A1 | 8/2008 | Wakabayashi |
| 2009/0006394 | A1 | 1/2009 | Snapp et al. |
| 2010/0088305 | A1 | 4/2010 | Fournier |

OTHER PUBLICATIONS

See What People Who Have Worked With TLA Are Saying; http://www.text-link-ads.com/testinnonials.php; pp. 1 to 4 of 4; printed on Apr. 28, 2009.

Work Smarter Experts Exchange Corporate Accounts; Hyperlinks pp. 1 to 2 of 2; printed on Apr. 28, 2009; http://www.experts-exchange.com/Software/Office.sub.--Productivity/Office-.sub.--Suites/MS.sub.--Office/Excel/Q.sub.--21793813.html.

Extended European Search Report dated Sep. 24, 2009 from corresponding European Patent Application No. 09159130.5.

David Pogue: "iPhone—The Missing Manual" Aug. 2008, O'Reilly Media Inc., Sebastopol, CA 95472, US, XP002545672 p. 66, last 4 lines.

Anonymous, "No Hyperlinks in Plain Text anymore", MSOutlook.info, pp. 1-2, retrieved from the Internet: URL:http://www.msoutlook.info/question/131, retrieved on Oct. 4, 2012.

Zheyuan, Yu, "High accuracy postal address extraction from web pages", Dalhousie University, Halifax, Nova Scotia, Mar. 2007, pp. 1-52, retrieved from the internet: URL:http://web.cs.dal.ca/~zyu/research/Thesis.pdf, retrieved on Oct. 4, 2012.

Communication Pursuant to Article 94(3) EPC from corresponding European Patent Application No. 09159130.5, issued on Oct. 17, 2012, 8 pages.

Amir et al., "Property matching and weighted matching," Theoretical Computer Science, Amsterdam, NL, May 2008, vol. 395 (2-3), pp. 298-310, XP022764617.

Summons to Attend Oral Proceedings dated Nov. 8, 2016 issued in respect of Corresponding EP Application No. EP09159130.5.

SYSTEM AND METHOD FOR LINKING AN ADDRESS

RELATED APPLICATION

The present application is a continuation of U.S. patent application Ser. No. 12/432,290 filed on Apr. 29, 2009, the entire contents of which are incorporated by reference, which issued as U.S. Pat. No. 8,775,467 on Jul. 8, 2014.

TECHNICAL FIELD

This application is related to a system and method for linking an address in a message.

BACKGROUND

Position broadcast systems, either terrestrial or satellite based, are used to provide location information to user devices. Examples of such systems include: GPS (Global Positioning System), GLONAS, Galileo, and WAAS or extended GPS.

Some mobile devices are now being made with the ability to obtain position or location information from such systems. For example, many mobile devices have GPS receivers. Applications on such mobile devices or on servers supporting the mobile devices can integrate the positional information obtained. For example, a mapping application may use the information to display a map showing a mobile device's current position.

Many mobile device also have address books stored thereon that contain information such as street addresses, cities, postal codes, provinces, states, countries and telephone numbers for each entry in the respective address book.

Within the text of an email or message, users of communication devices or computers may send messages that include phone numbers, email addresses, web addresses. Applications on some devices create hyperlinks for phone numbers, email addresses and web addresses, so that the user can click on the link within the message and the device will respond by respectively either placing a call, opening an email to be sent, opening the browser to the linked web page.

BRIEF DESCRIPTION OF THE DRAWINGS

Examples of embodiments will now be described in greater detail with reference to the accompanying drawings, in which.

DETAILED DESCRIPTION

Figure 1:
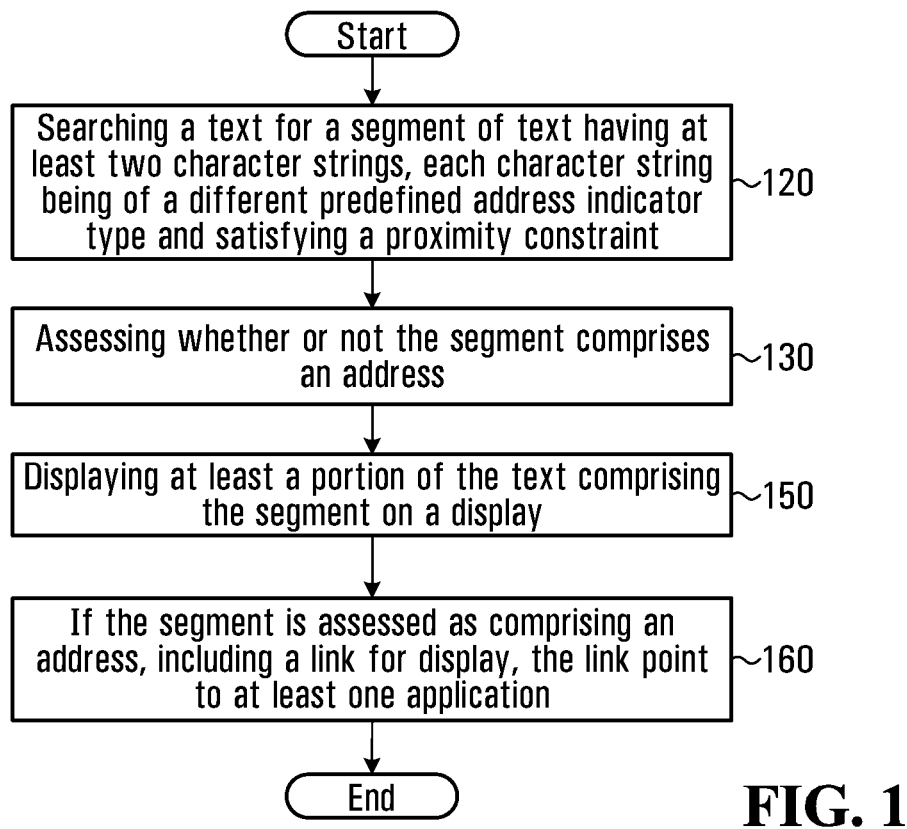
FIG. 1 is a flowchart of a method for hyperlinking an address.

A system and method is provided to detect an address within a text message, create a link this physical address so that selecting the link will result, for example, in the address location being displayed on a map.

In an embodiment, text within a message is searched looking for at least 2 character strings that are different "address indicators" to determine if a piece of text is an address. First, the text is searched for a street number, street prefixes or suffixes (west, north, south, east, etc), street type (Road, Rd., Street, St., Cres, Crescent etc), city, state/province or country name. Depending on which of these "address indicators" are found within the text and depending on the text surrounding these address indicators, an assessment of the probability that the text is a valid address is made. If the assessment is that the address is valid, a link is created to launch a map corresponding to the address text.

To help this assessment, in some embodiments, the address indicators are cross-referenced as appropriate. For example, cities, states and countries can be cross-referenced such that if a city is found within the text with an incorrect country or state, a link will not be produced. The address indicators, in some embodiments are cross-referenced or associated with each other in a database.

Accordingly, in one aspect, there is provided a method, the method comprising: searching a text for a segment of text having at least two character strings satisfying a proximity constraint, each character string being of a different predefined address indicator type; assessing whether or not the segment comprises an address; displaying at least a portion of the text comprising the segment on a display of a mobile device; and if the segment is assessed as comprising an address, including a link for display, the link pointing to at least one application.

In another aspect, there is provided a mobile device comprising: a receiver for receiving a message containing text; a user interface for displaying the text; a memory for storing the text; an address linking module configured to: search the text for a segment of text having at least two character strings satisfying a proximity constraint, each character string being of a different predefined address indicator type; assess whether or not the segment comprises an address; display at least a portion of the text comprising the segment on a display of a mobile device; and if the segment is assessed as comprising an address, include a link for display, the link pointing to at least one application.

In another aspect, there is provided at least one tangible computer readable medium having computer executable instructions stored thereon that when executed implement a method, the method comprising: searching a text for a segment of text having at least two character strings satisfying a proximity constraint, each character string being of a different predefined address indicator type; assessing whether or not the segment comprises an address; displaying at least a portion of the text comprising the segment on a display of a mobile device; and if the segment is assessed as comprising an address, including a link for display, the link pointing to at least one application.

In another aspect, there is provided a method for displaying text comprising: searching a message text for an address indicator; determining whether a text segment of the message text that contains the address indicator comprises an address; and displaying at least a portion of the message text on a display of a mobile device wherein the display of any text segment that is determined to comprise an address includes a link pointing to at least one application.

In an embodiment the act of determining whether a segment of text comprises an address includes having at least two character strings satisfying a proximity constraint, each character string being of predefined address indicator type.

In another embodiment the act of displaying includes providing a visible indication of the link within the text on the display.

Referring now to FIG. 1, a method will be described. The method starts at step 120, with searching a text for a segment of text having at least two character strings satisfying a proximity constraint, each character string being of a different predefined address indicator type. Non-limiting examples of address indicator types include: a number, a street prefix, a street suffix, a street type, a city name, a state, a province, a country, and a postal code. Non-limiting examples of proximity constraints include: a number within a threshold proximity of a street prefix; a street prefix within a threshold proximity of a street type; and a street type within a threshold proximity of a city name. It is to be understood that the threshold constraint can apply to proximity of any one of the character strings to any other of the character strings.

The text in some embodiments is text received in a message, such as, but not limited to an email message, an SMS (Short Message Service) message, an instant message or an electronic document.

The next step is assessing whether or not the segment comprises an address (step 130). An assessment that the segment comprises an address is made in some embodiments if the address exists in a database, in other embodiments if least some of the character strings have been assessed as valid, in other embodiments if a threshold confidence level or probability that the segment comprises an address has been met. It is to be understood that the examples of how the assessment is made are non-limiting and other embodiments may be implemented. In one example, a valid address could be one for which the given city does exist within the province or state given. In other embodiments, confirmation that the street exists within the city is required for to make an assessment that the segment comprises an e address. In still other embodiments, confirmation that the number exists for the street given is required.

At step 150, the method continues with displaying at least a portion of the text comprising the segment on a display on a mobile device. At step 160, if the segment is assessed as comprising an address, a link is included for display, the link pointing to at least one application. In some embodiments, including a link comprises incorporating the link into a copy of the text. In some embodiments the copy of the text is a local copy. A non-limiting example of a link is a hyperlink.

In some embodiments, the link is configured to start an application to display the address on a map on the display, when selected. For example, the link could be a hyperlink that points to a map application showing the location of the address on a street map. In some embodiments, the link is configured to point to an application to present a menu of options related to the address on the display of the mobile device. Non-limiting examples of options that are included in some embodiments are: adding the address to an address book; indicating a location of the address on a map; obtaining directions to the address from another location; obtaining directions from the address to another location; obtaining a telephone number associated with the address; and obtaining a name of a person or company associated with the address.

The embodiments of the link pointing to a map application and pointing to a menu of options are not mutually exclusive of each other. In some embodiments, the link is configured to point to one application if it is selected using one keystroke or input device and to another application if it is selected in a different manner. For example, clicking on a thumbwheel could launch the map application and a special function key could launch the menu of options. In this manner the link can be created to point to any number of applications.

An exemplary embodiment of the method further comprises obtaining geocode information for the address for use in the application. For example, latitude and longitude corresponding to a street address can be obtained using a geocoding application and provided to a map application in order to display the location on the map.

The method, in other embodiments, further comprises starting the application upon selection of the link. The link can be activated, for example, when a user moves a cursor over highlighted text to which the link is anchored and selects the highlighted text.

In some embodiments, assessing whether or not the segment comprises an address comprises first determining if one of the character strings of one predefined address indicator type in the segment is associated in a database with at least another of the character strings of a different predefined address indicator type in the segment. If the one character string is associated with the other character string in the database, the address is assessed as valid. In other embodiments, at least a portion of the text is validated against an address database. In still other embodiments, at least two of the character strings of different predefined address indictor types are validated against an address database.

Figure 2:
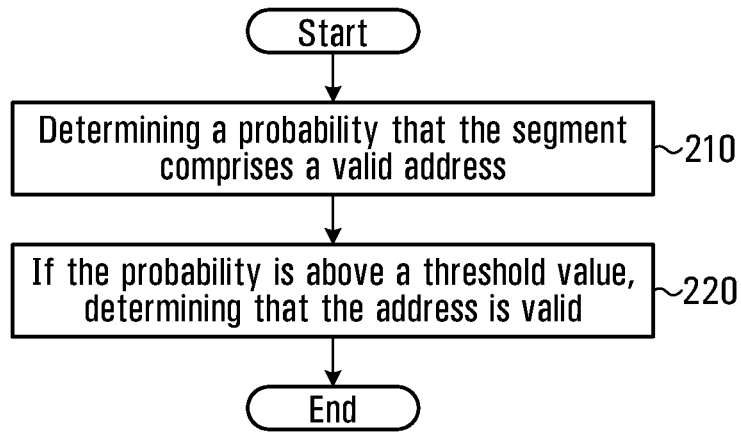
FIG. 2 is a flowchart of a method for assessing that an address is valid.

Referring now to FIG. 2, an exemplary embodiment making the assessment as to whether or not the segment comprises an address will be described. At step 210 the assessment starts with determining a probability that the segment comprises a valid address based on a number of character strings of different predefined address indicator types within the segment, a number of character strings of different predefined address indicator types that are associated in a database and proximities of the character strings to each other. Then at step 220, if the probability is above a threshold probability, the address is assessed as valid. For example, a segment with a number and street prefix with in two words of each other and a city name but no indicator associated with the city name will have a lower probability of being valid in some embodiments, than a segment with a number and a street suffix within two words and a city name and province, where the city name and province are associated with each other.

The link can be identified in the text by changing the font of the segment to indicate the link. Exemplary ways of identifying the hyperlink are with a different colour, different font size, different font type, underlining, bold text and italics. In still other embodiments, the link is identified by inserting a symbol or character string into the text indicating the link.

In some embodiments, the method further comprises generating computer executable instructions to insert the link into the text and storing the generated computer executable instructions on a memory in the mobile device.

It is to be understood that the methods described herein can be implemented in any manner feasible for use in mobile devices. Non-limiting examples include using software, firmware, hardware or combinations thereof. It is also to be understood that the method steps in some non-limiting embodiments are executed on the mobile device. In other embodiments, at least one of the method steps is performed at a server accessible over a wireless interface. Non-limiting examples of steps that can be performed at the server are: searching the text, making the assessment and inserting the link. Furthermore, the method steps are not limited to the order presented. They can be performed in any feasible order.

Non-limiting exemplary embodiments of how the method is implemented follow. Take the following 3 examples of text within a message:

a) Edmonton BC USA
b) 450 March Rd, Kanata, ON, Canada
c) 450 March Rd

In example a) although Edmonton, BC and USA are all within the address indicator list for cities, states and countries, they are not cross referenced since Edmonton is not in the province/state of BC and BC is not in the country of USA, therefore this would not be considered an address which is correct.

In example b) the street number (450), street type (Rd), City (Kanata), State/Province (ON) and country (Canada) are all address indicators. Furthermore, with a single word between the Street number and Street Suffix indicates a high probability that this is the Street Name (March) and Kanata, ON, Canada are all cross referenced. So with 5 address indicators, 3 cross-references and the street number and suffix in an acceptable relative position, this would correctly be assessed as an address and a link would be created.

In example c) the street number and street suffix are address indicators and are in the correct relative position. This example is on the threshold which could hyperlink this address (in this case correctly). If the threshold for success is set higher (minimum 3 address indicators) then this address would not be hyperlinked in this case.

In an exemplary embodiment of the invention, a number is used as a trigger to search for at least two address indicators, or at least two character strings that are of different address indicator types. In general terms, an address recognizer searches forward in a block of text from the number for at least two or more address indicators. The recognizer aborts searching when the number of words following the trigger number exceeds certain threshold. Otherwise, it continues to search until one of the following conditions is met:

a. the block of text is assessed as containing all components of an address. In other words, a confidence level or probability that the block of text is an address is maximum;
b. another number trigger is encountered;
c. the number of words that are not address indicators following the last address indicator exceeds a certain threshold.

Once an arbitrary string is recognized as an address, it is converted to a link. Clicking on this link will provide options such as view the address on the map or add it to the Address Book.

Figure 3A:
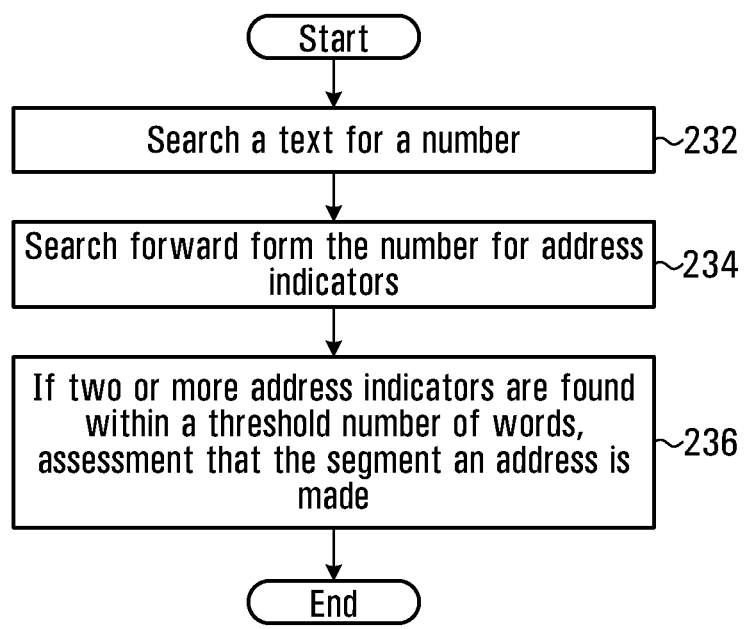
FIG. 3A is a flowchart of a method of assessing a block of text as comprising an address.

An implementation of a method using a number as a trigger will now be described with reference to FIG. 3A. The method starts with searching a text for a number (Step 232). If a number is found, it is a trigger to search forward from the number for address indicators (Step 234). If two or more address indicators are found within a threshold number of words of the number, then an assessment that the segment of text including and following the number up to the last address indicator found is an address is made (Step 236).

In a non-limiting exemplary embodiment, to minimize false positives, a block or segment of text comprising a number followed by only two address indicators will only be assessed as an address if the two address indicators are one of the following combinations:

a street classifier (such as street prefix, street suffix, or street type) and a major city;
a street classifier and a non-abbreviated province/state;
a major city and a non-abbreviated country; and
a province/state and non-abbreviated country.

Major city can be defined as any one of a group of cities stored in a database.

In some embodiments, a link is only included if a threshold confidence level that the segment comprises an address pattern is reached. Confidence level, in some embodiments, is quantified with a mathematic method. For example, in an implementation, an initial integer value "0" indicates there is not enough information to assess that the segment comprises an address. During parsing, positive or negative quantified information is obtained. For example, if a street type, street prefix or street suffix is found a weighted confidence of 5 is added to the confidence level. If a city name or state/province name from a dictionary is found, a weighted confidence of 7 is added. Similarly, weighted confidences can be added for postal code patterns, country names, and abbreviations. Once the confidence level reaches a threshold (for example, 15), the segment of text is assessed as an address.

In some embodiments, data required to assess whether a segment of text is an address is stored on the mobile device. To limit the storage requirement, the data in some embodiments is stored, for example, using hashcodes. In other embodiments, the data is stored external to the mobile device. For example, the data can be stored in a database on a server. In still other embodiments, data for addresses that are more likely to appear in text can be stored on the mobile device and a larger database on a server can be accessed if required. For example, if a number, province and country is found in the data on the mobile device but there is no match to a city within the data on the mobile device, a search of an external database for a city matching a character string preceding the province can be conducted.

In an exemplary embodiment, the following is stored on the mobile device:

a list of street prefixes, suffixes and types;
a list of major cities, for example, large metropolitan areas with population over one million, country capitals, state and province capitals are considered major cities in some embodiments;
a list of states and provinces (in both full and abbreviated forms); and
a list of countries (in both full and abbreviated forms).

In some embodiments, all of the above strings are normalized and stored as dictionaries of hashcodes. Each character string to be compared is normalized and converted to a hashcode before being compared to address indicators stored in the database. This allows for fast lookup and efficient use of memory. Comparing a character string to character strings in a database requires comparing each character, one character at a time. Comparing a hashcode is simply determining if one number is equal to another number.

Figure 3B:
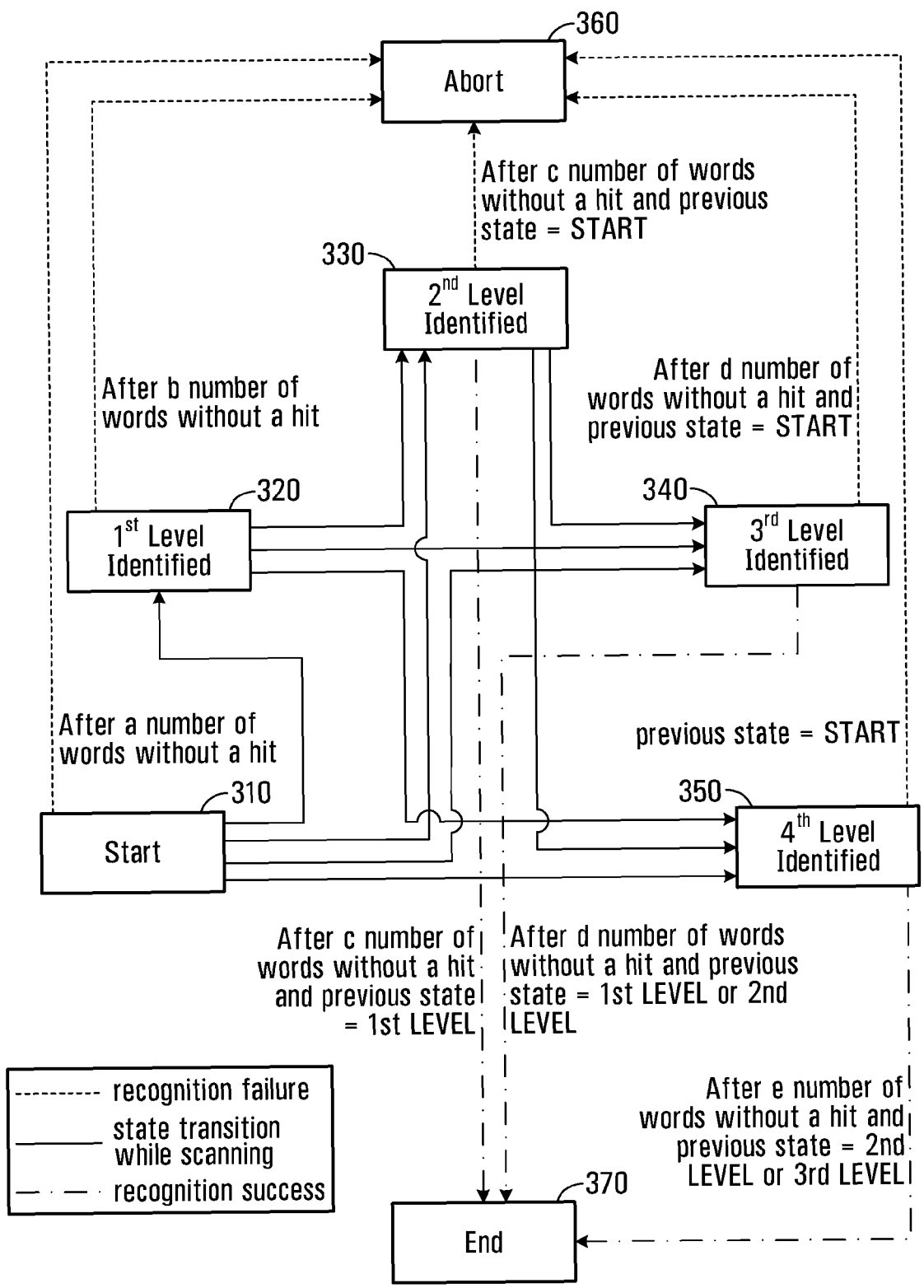
FIG. 3B is a state diagram of a method of assessing a segment of text as comprising an address.

FIG. 3B is a state diagram of an implementation of the method described with reference to FIG. 3A. The state diagram has the following states: START 310, 1$^{st}$ LEVEL IDENTIFIED 320, 2$^{nd}$ LEVEL IDENTIFIED 330, 3$^{rd}$ LEVEL IDENTIFIED 340, 4$^{th}$ LEVEL IDENTIFIED 350, ABORT 360, and END 370. The START state 310 is triggered by finding a number in a text. In this implementation, the 1$^{st}$ LEVEL IDENTIFIED state 320 is reached if a street prefix, suffix or type is found. The $2^{nd}$ LEVEL IDENTIFIED state 330 is reached if a city is found. The $3^{rd}$ LEVEL IDENTIFIED state 340 is reached if a state or province is found. The $4^{th}$ LEVEL IDENTIFIED state 350 is reached if a country or postal code is found. From the START state 310, the method proceeds to any of the other states depending on the results of a search forward from the number. After the START state 310, if 'a' number of words are searched without a hit or finding an address indicator, the method proceeds to the ABORT state 370, where searching is ceased without assessing the text as containing an address. After the $1^{st}$ LEVEL IDENTIFIED state 320, if 'b' number of words are searched without a hit, the method proceeds to the ABORT state 360. After the $2^{nd}$ LEVEL IDENTIFIED state 330, if 'c' number of words are searched without a hit and the previous state was the START state 310, the method proceeds to the ABORT state. After the $2^{nd}$ LEVEL IDENTIFIED state 330, if 'c' number of words are searched without a hit and the previous state was the $1^{st}$ LEVEL IDENTIFIED state 320, the method proceeds to the END state 370, with an assessment that an address has been identified. After the $3^{rd}$ LEVEL IDENTIFIED state 340, if 'd' number of words are searched without a hit and the previous state was the START state 310, the method proceeds to the ABORT state 360. After the $3^{rd}$ LEVEL IDENTIFIED state 340, if 'd' number of words are searched without a hit and the previous state was the $1^{St}$ LEVEL IDENTIFIED 320 or the $2^{nd}$ LEVEL IDENTIFIED state 330, then the method proceeds to the END state 370 with an assessment that an address has been identified. At the $4^{th}$ LEVEL IDENTIFIED state 350, if the previous state was the START state 310, then the method proceeds to the ABORT state 360. After the $4^{th}$ LEVEL IDENTIFIED state 350, if 'e' number of words are searched without a hit and the previous state was the $2^{nd}$ LEVEL IDENTIFIED state 330 or the $3^{rd}$ LEVEL IDENTIFIED state 340, then the method proceeds to the END state 370 with an assessment that an address has been identified. In an exemplary embodiment, the variables are defined as follows:

- a=an arbitrary number that accounts for an address with a longest envisaged street name (without prefix/suffix), a longest envisaged city name and a longest envisaged province/state name;
- b=an arbitrary number that accounts for an address with a longest envisged street name (with prefix such as Chemin, Avenue, etc. . . . Most French street-types come before the street name) and a longest envisaged city name;
- c=an arbitrary number that accounts for a longest envisaged province/state name;
- d=an arbitrary number that accounts for a longest envisaged country name; and
- e=an arbitrary number that accounts for a longest postal code/country name.

Figure 4:
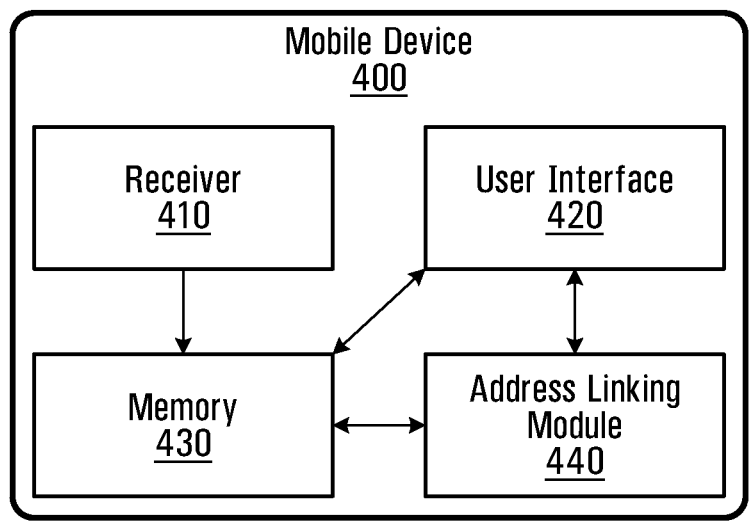
FIG. 4 is a block diagram of elements of a mobile device according to one embodiment.

Referring now to FIG. 4, a mobile device 400 according to an embodiment will be described. The mobile device 400 comprises a receiver 410, a user interface 420, a memory 430, and an address linking module 440. The receiver 410 is for receiving a message containing text. The user interface 420 is for displaying the text. The address linking module 440 is configured to: search the text for a segment of text having at least two character strings satisfying a proximity constraint, each character string being of a different pre-defined address indicator type; assess whether or not the segment comprises an address; display at least a portion of the text comprising the segment on a display of a mobile device; and if the segment is assessed as comprising an address, include a link for display, the link pointing to at least one application. The address linking module can be implemented using software, hardware, firmware or combinations thereof or in any other manner feasible for use in the mobile device.

In some embodiments of the mobile device, the user interface 420 is a display screen, such as an LCD screen or a touch activated screen.

The mobile device of some embodiments further comprises a user input device with which the link can be selected. Non-limiting examples of the user input device include at least one of a track ball, a thumbwheel, a keypad, a touch activated screen, and a stylus. In some embodiments, the user input device can be used to move a cursor on a display screen over text that is highlighted to indicate the link and then activate the link by clicking on or selecting the highlighted text.

In some embodiments, the mobile device 400 further comprises an electronic address book to which the module can add the address or update an existing entry to reflect the address. For example, once a valid address is verified and the link is created, activating the link in some embodiments presents the option to add the address to the electronic address book or to update an existing entry. The mobile device 400 in some embodiments is configured to search the address book for addresses that match the linked address. If the linked address is not in the address book, the user can be presented with the option to add the linked address to the address book. In some embodiments other information related to the address, such as name, phone number or postal code can be added by the user. In other embodiments, the other information can be obtained from an external database or from an internet based service that cross-references addresses to other information, such as names, phone numbers, or postal codes. If the other information is obtained from an external resource, an option can be presented on the user interface 420 to add the obtained information together with the address to the address book. If the address is already in the address book, an option can be presented on the user interface to obtain the other information from the address book, such as a name, phone number or postal code.

Figure 5A:
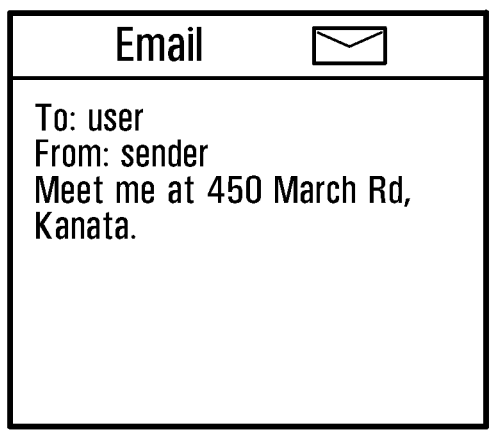
FIGS. 5A to 5D are screen shots demonstrating implementations of embodiments.
Figure 5B:
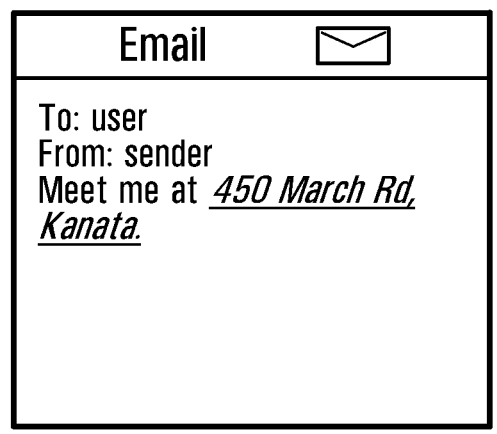
Figure 5C:
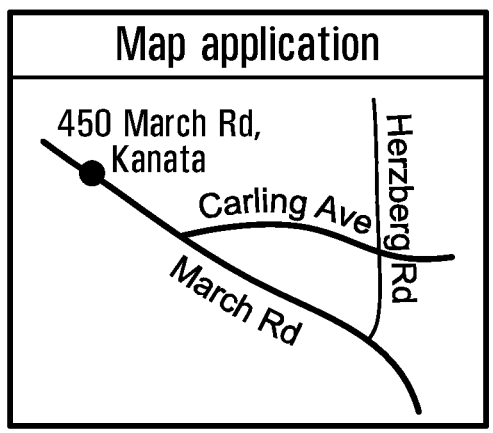
Figure 5D:
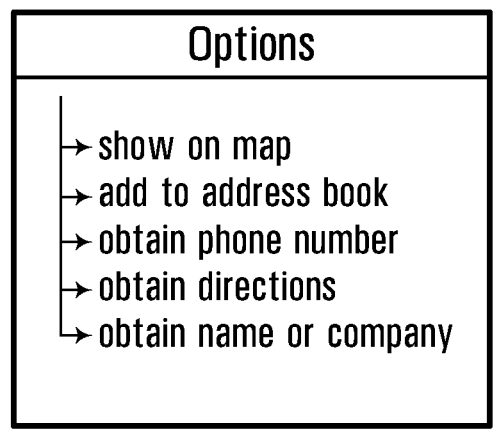

FIGS. 5A to 5D are screen shots of possible implementations of the methods described herein on a user interface of a mobile device. FIG. 5A is a screen shot of an email to a user from a sender, with a message that has the text "Meet me at 550 March Rd, Kanata." As the text of the message contains a valid address, according to embodiments of the methods described herein, a link, such as a hyperlink, is created using the address as a source anchor. The address is highlighted, as shown in FIG. 5B to indicate that a link has been created. If the link is selected by a user, in some embodiments, a map is automatically displayed showing the location of the address, as shown in FIG. 5C. In some embodiments, the link points to a menu of options. An example of such a menu is shown in the screen shot of FIG. 5D.

In some embodiments, there is provided a tangible computer readable medium having computer executable instructions stored thereon that when executed implement a method. The method is any method described herein. In some embodiments, the tangible computer readable medium is a memory on a mobile device. In some embodiments, the instructions are for execution by a processor on the mobile device.

Figure 6:
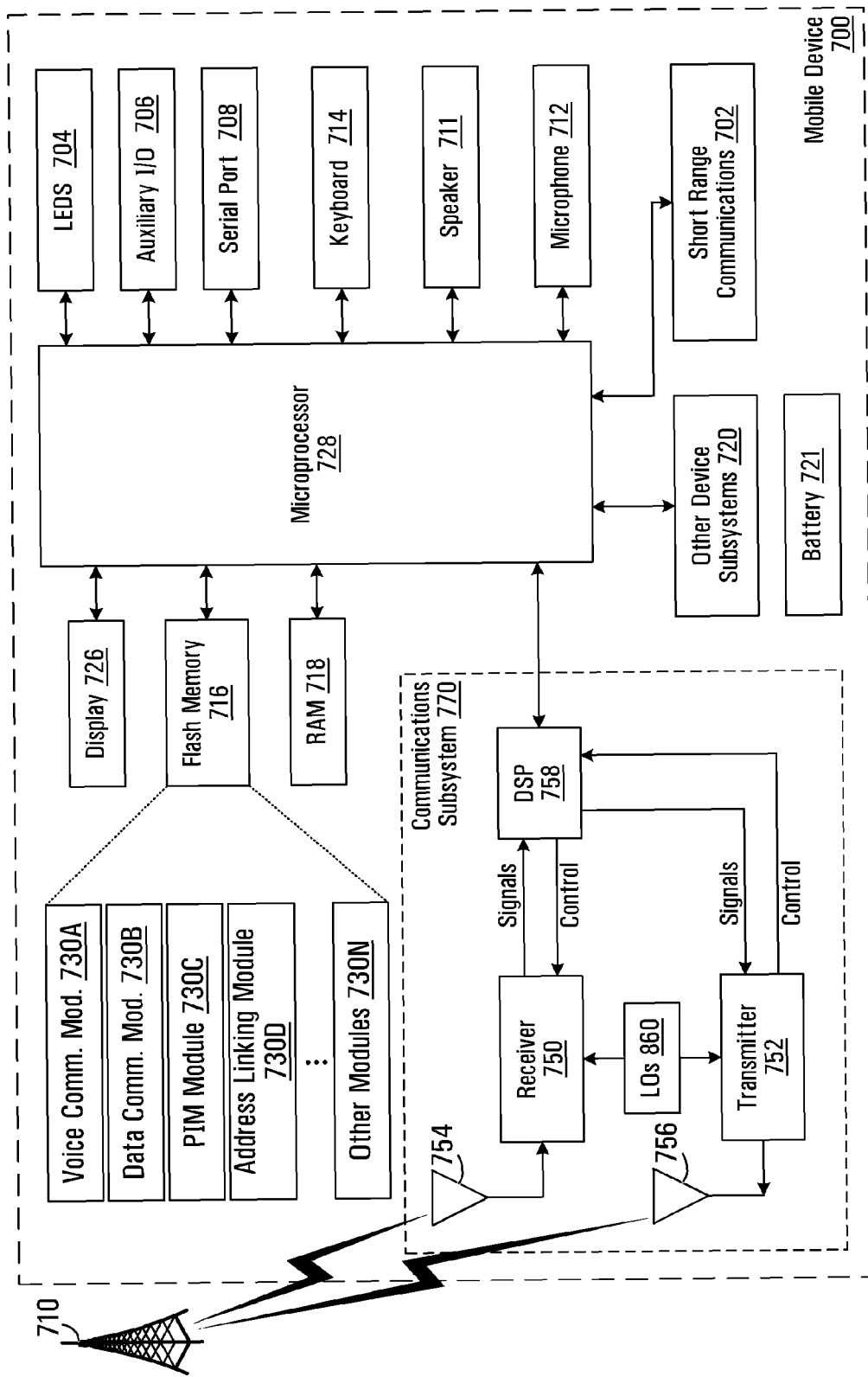
FIG. 6 is a block diagram of a mobile device on which the methods described herein may be executed.

Referring now to FIG. 6, shown is a block diagram of another mobile device 700 that may implement any of the methods described herein. It is to be understood that the mobile device 700 is shown with very specific details for example purposes only.

A processing device (a microprocessor 728) is shown schematically as coupled between a keyboard 714 and a display 726. The microprocessor 728 controls operation of the display 726, as well as overall operation of the mobile device 700, in response to actuation of keys on the keyboard 714 by a user.

The mobile device 700 has a housing that may be elongated vertically, or may take on other sizes and shapes (including clamshell housing structures). The keyboard 714 may include a mode selection key, or other hardware or software for switching between text entry and telephony entry.

In addition to the microprocessor 728, other parts of the mobile device 700 are shown schematically. These include: a communications subsystem 770; a short-range communications subsystem 702; the keyboard 714 and the display 726, along with other input/output devices including a set of LEDS 704, a set of auxiliary I/O devices 706, a serial port 708, a speaker 711 and a microphone 712; as well as memory devices including a flash memory 716 and a Random Access Memory (RAM) 718; and various other device subsystems 720. The mobile device 700 may have a battery 721 to power the active elements of the mobile device 700. The mobile device 700 is in some embodiments a two-way radio frequency (RF) communication device having voice and data communication capabilities. In addition, the mobile device 700 in some embodiments has the capability to communicate with other computer systems via the Internet.

Operating system software executed by the microprocessor 728 is in some embodiments stored in a persistent store, such as the flash memory 716, but may be stored in other types of memory devices, such as a read only memory (ROM) or similar storage element. In addition, system software, specific device applications, or parts thereof, may be temporarily loaded into a volatile store, such as the RAM 718. Communication signals received by the mobile device 700 may also be stored to the RAM 718.

The microprocessor 728, in addition to its operating system functions, enables execution of software applications on the mobile device 700. A predetermined set of software applications that control basic device operations, such as a voice communications module 730A and a data communications module 730B, may be installed on the mobile device 700 during manufacture. In addition, a personal information manager (PIM) application module 730C may also be installed on the mobile device 700 during manufacture. The PIM application is in some embodiments capable of organizing and managing data items, such as e-mail, calendar events, voice mails, appointments, and task items. The PIM application is also in some embodiments capable of sending and receiving data items via a wireless network 710. In some embodiments, the data items managed by the PIM application are seamlessly integrated, synchronized and updated via the wireless network 710 with the device user's corresponding data items stored or associated with a host computer system.

In addition, a software application to perform an address linking function 730D may be installed. The address linking function 730D may implement any of the methods described herein for linking an address.

As well, additional software modules, illustrated as another software module 730N, may be installed during manufacture.

Communication functions, including data and voice communications, are performed through the communication subsystem 770, and possibly through the short-range communications subsystem 702. The communication subsystem 770 includes a receiver 750, a transmitter 752 and one or more antennas, illustrated as a receive antenna 754 and a transmit antenna 756. In addition, the communication subsystem 770 also includes a processing module, such as a digital signal processor (DSP) 758, and local oscillators (LOs) 760. The specific design and implementation of the communication subsystem 770 is dependent upon the communication network in which the mobile device 700 is intended to operate. For example, the communication subsystem 770 of the mobile device 700 may be designed to operate with the Mobitex™, DataTAC™ or General Packet Radio Service (GPRS) mobile data communication networks and also designed to operate with any of a variety of voice communication networks, such as Advanced Mobile Phone Service (AMPS), Time Division Multiple Access (TDMA), Code Division Multiple Access CDMA, Personal Communications Service (PCS), Global System for Mobile Communications (GSM), etc. Other types of data and voice networks, both separate and integrated, may also be utilized with the mobile device 700.

Network access requirements vary depending upon the type of communication system. For example, in the Mobitex™ and DataTAC™ networks, mobile devices are registered on the network using a unique Personal Identification Number (PIN) associated with each device. In GPRS networks, however, network access is associated with a subscriber or user of a device. A GPRS device therefore requires a subscriber identity module, commonly referred to as a Subscriber Identity Module (SIM) card, in order to operate on a GPRS network.

When required network registration or activation procedures have been completed, the mobile device 700 may send and receive communication signals over the communication network 710. Signals received from the communication network 710 by the receive antenna 754 are routed to the receiver 750, which provides for signal amplification, frequency down conversion, filtering, channel selection, etc., and may also provide analog to digital conversion. Analog-to-digital conversion of the received signal allows the DSP 758 to perform more complex communication functions, such as demodulation and decoding. In a similar manner, signals to be transmitted to the network 710 are processed (e.g., modulated and encoded) by the DSP 758 and are then provided to the transmitter 752 for digital to analog conversion, frequency up conversion, filtering, amplification and transmission to the communication network 710 (or networks) via the transmit antenna 756.

In addition to processing communication signals, the DSP 758 provides for control of the receiver 750 and the transmitter 752. For example, gains applied to communication signals in the receiver 750 and the transmitter 752 may be adaptively controlled through automatic gain control algorithms implemented in the DSP 958.

In a data communication mode, a received signal, such as a text message or web page download, is processed by the communication subsystem 770 and is input to the microprocessor 728. The received signal is then further processed by the microprocessor 928 for an output to the display 726, or alternatively to some other auxiliary I/O devices 706. A device user may also compose data items, such as e-mail messages, using the keyboard 714 and/or some other auxiliary I/O device 706, such as a touchpad, a rocker switch, a thumb-wheel, or some other type of input device. The composed data items may then be transmitted over the communication network 710 via the communication subsystem 770.

In a voice communication mode, overall operation of the device is substantially similar to the data communication mode, except that received signals are output to a speaker 711, and signals for transmission are generated by a microphone 712. Alternative voice or audio I/O subsystems, such as a voice message recording subsystem, may also be implemented on the device 700. In addition, the display 726 may also be utilized in voice communication mode, for example, to display the identity of a calling party, the duration of a voice call, or other voice call related information.

The short-range communications subsystem 702 enables communication between the mobile device 700 and other proximate systems or devices, which need not necessarily be similar devices. For example, the short-range communications subsystem may include an infrared device and associated circuits and components, or a Bluetooth™ communication module to provide for communication with similarly-enabled systems and devices.

What has been described is merely illustrative of the application of the principles of methods, modules and devices described herein. Other arrangements and methods can be implemented by those skilled in the art without departing from the spirit and scope of the embodiments.

The invention claimed is:

1. A method for use on a mobile device comprising a display, the method comprising on the mobile device:
   searching a text, wherein said searching comprises:
   finding a number in the text,
   once the number is found, searching forward in the text within a predetermined number of words of the number,
   identifying at least two character strings during said search forward, each character string being of a different predefined address indicator type, and
   selecting a segment of the text including the number and said at least two character strings;
   assessing whether or not the segment comprises an address;
   displaying the segment on the display of the mobile device; and
   if the segment is assessed as comprising an address, including a link for display, the link pointing to at least one application,
   wherein searching the text further comprises:
   searching for at least two character strings following a number and that are a street classifier and a city name from a list of city names in a database; and
   wherein assessing whether or not the segment comprises an address comprises:
   determining a probability that the segment comprises a valid address based on at least: a number of character strings of different predefined address indicator types within the segment, a number of character strings of different predefined address indicator types within the segment that are cross-referenced in a database, and proximities of the at least two character strings to each other; and
   if the probability is above a threshold probability, assessing the address as valid.

2. The method of claim 1, wherein assessing whether or not the segment comprises an address further comprises validating at least two of the character strings of different predefined address indicator types against an address database.

3. The method of claim 1, wherein the predefined address indicator types comprise at least two of a number, a street prefix, a street suffix, a street type, a city, a state, a province, a country, and a postal code.

4. The method of claim 1, further comprising converting each character string within a threshold proximity of the number into a hashcode for comparison with a database of address indicators that are stored as hashcodes.

5. The method of claim 1, further comprising aborting the searching for the at least two character strings after making an assessment that the segment comprises an address or a number of words following a last character string of an address indicator type exceeds a threshold value.

6. A method for use on a mobile device comprising a display, the method comprising on the mobile device:
   searching a text, wherein said searching comprises:
   finding a number in the text,
   once the number is found, searching forward in the text within a predetermined number of words of the number,
   identifying at least two character strings during said search forward, each character string being of a different predefined address indicator type, and
   selecting a segment of the text including the number and said at least two character strings;
   assessing whether or not the segment comprises an address;
   displaying the segment on the display of the mobile device; and
   if the segment is assessed as comprising an address, including a link for display, the link pointing to at least one application,
   wherein searching the text further comprises:
   searching for at least two character strings following a number and that are a street classifier and a non-abbreviated province or state; and
   wherein assessing whether or not the segment comprises an address comprises:
   determining a probability that the segment comprises a valid address based on at least: a number of character strings of different predefined address indicator types within the segment, a number of character strings of different predefined address indicator types within the segment that are cross-referenced in a database, and proximities of the at least two character strings to each other; and
   if the probability is above a threshold probability, assessing the address as valid.

7. The method of claim 6, wherein assessing whether or not the segment comprises an address further comprises validating at least two of the character strings of different predefined address indicator types against an address database.

8. The method of claim 6, wherein the predefined address indicator types comprise at least two of a number, a street prefix, a street suffix, a street type, a city, a state, a province, a country, and a postal code.

9. The method of claim 6, further comprising converting each character string within a threshold proximity of the number into a hashcode for comparison with a database of address indicators that are stored as hashcodes.

10. The method of claim 6, further comprising aborting the searching for the at least two character strings after making an assessment that the segment comprises an address or a number of words following a last character string of an address indicator type exceeds a threshold value.

11. A mobile device comprising:
a receiver for receiving a message containing text;
a user interface for displaying the text;
a memory for storing the text;
an address linking module configured to:
search the text, wherein said search is configured to:
find a number in the text,
once the number is found, search forward in the text within a predetermined number of words of the number,
identify at least two character strings during said search forward, each character string being of a different predefined address indicator type, and
select a segment of the text including the number and said at least two character strings;
assess whether or not the segment comprises an address;
display at least a portion of the text comprising the segment on a display of a mobile device; and
if the segment is assessed as comprising an address, include a link for display, the link pointing to at least one application,
wherein said search is further configured to:
search for at least two character strings following a number and that are a city name from the list of city names in a database and a non-abbreviated country; and
wherein to assess whether or not the segment comprises an address, the address linking module is configured to:
determine a probability that the segment comprises a valid address based on at least: a number of character strings of different predefined address indicator types within the segment, a number of character strings of different predefined address indicator types within the segment that are cross-referenced in a database, and proximities of the at least two character strings to each other; and
if the probability is above a threshold probability, assess the address as valid.

12. The mobile device of claim 11, wherein to assess whether or not the segment comprises an address, the address linking module is further configured to validate at least two of the character strings of different predefined address indicator types against an address database.

13. The mobile device of claim 11, wherein the predefined address indicator types comprise at least two of a number, a street prefix, a street suffix, a street type, a city, a state, a province, a country, and a postal code.

14. The mobile device of claim 11, wherein the address linking module is further configured to convert each character string within a threshold proximity of the number into a hashcode for comparison with a database of address indicators that are stored as hashcodes.

15. The mobile device of claim 11, wherein the address linking module is further configured to abort the search for the at least two character strings after making an assessment that the segment comprises an address or a number of words following a last character string of an address indicator type exceeds a threshold value.

16. At least one tangible computer readable medium having computer executable instructions stored thereon that when executed implement a method, the method comprising:
searching a text, wherein said searching comprises:
finding a number in the text,
once the number is found, searching forward in the text within a predetermined number of words of the number,
identifying at least two character strings during said search forward, each character string being of a different predefined address indicator type, and
selecting a segment of the text including the number and said at least two character strings;
assessing whether or not the segment comprises an address;
displaying at least a portion of the text comprising the segment on a display of a mobile device; and
if the segment is assessed as comprising an address, including a link for display, the link pointing to at least one application,
wherein searching the text further comprises:
searching for at least two character strings following a number and that are a province or state and non-abbreviated country; and
wherein assessing whether or not the segment comprises an address comprises:
determining a probability that the segment comprises a valid address based on at least: a number of character strings of different predefined address indicator types within the segment, a number of character strings of different predefined address indicator types within the segment that are cross-referenced in a database, and proximities of the at least two character strings to each other; and
if the probability is above a threshold probability, assessing the address as valid.

17. The at least one tangible computer readable medium of claim 16, wherein assessing whether or not the segment comprises an address further comprises validating at least two of the character strings of different predefined address indicator types against an address database.

18. The at least one tangible computer readable medium of claim 16, wherein the predefined address indicator types comprise at least two of a number, a street prefix, a street suffix, a street type, a city, a state, a province, a country, and a postal code.

19. The at least one tangible computer readable medium of claim 16, wherein searching the text further comprises converting each character string within a threshold proximity of the number into a hashcode for comparison with a database of address indicators that are stored as hashcodes.

20. The at least one tangible computer readable medium of claim 16, wherein searching the text further comprises aborting the searching for the at least two character strings after making an assessment that the segment comprises an address or a number of words following a last character string of an address indicator type exceeds a threshold value.

* * * * *